(No Model.)
S. R. BAILEY.
CARRIAGE.
No. 460,547. Patented Oct. 6, 1891.
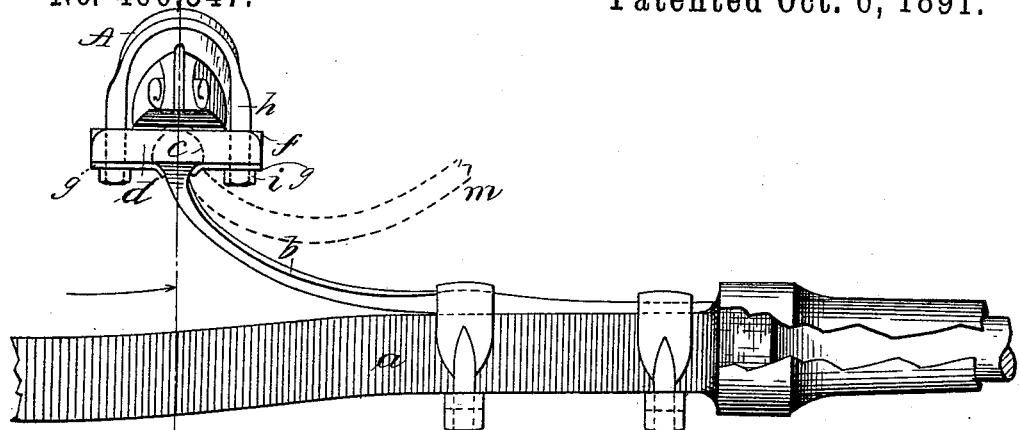
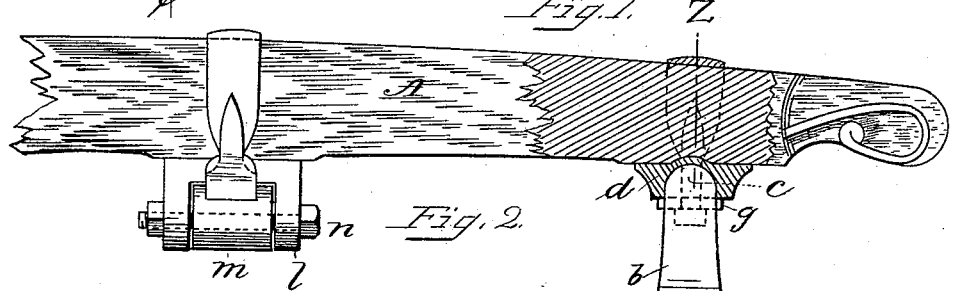
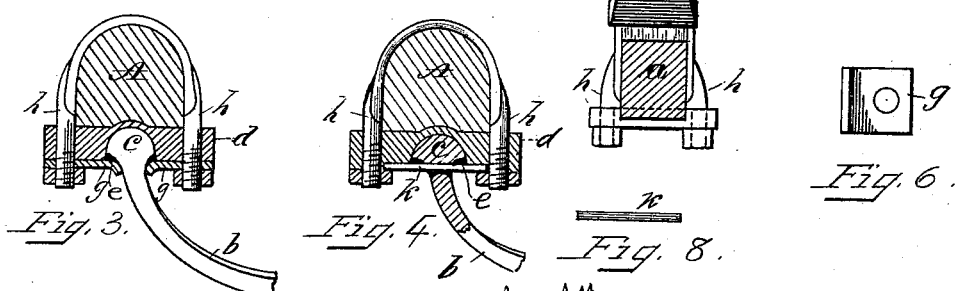
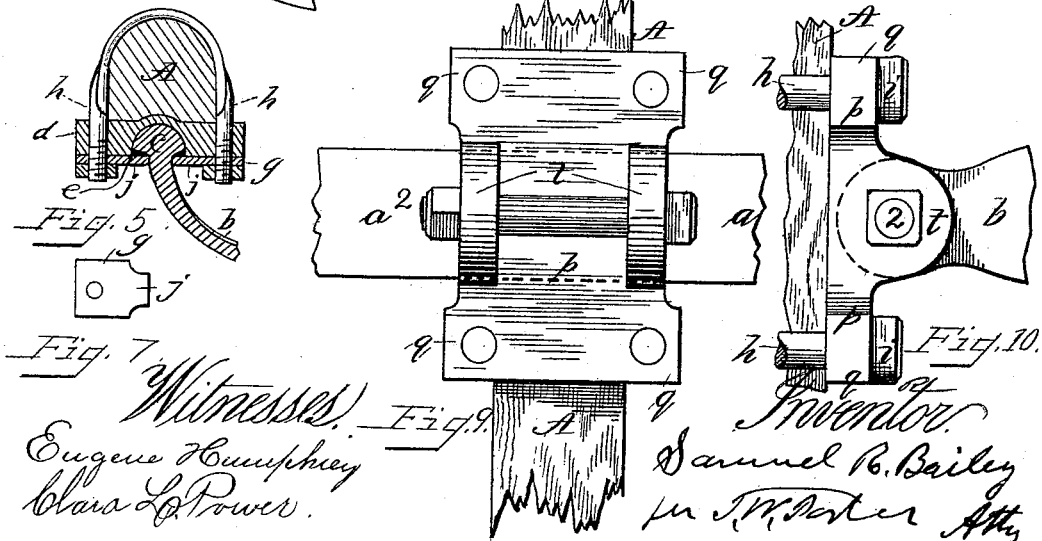
Witnesses
Eugene Humphrey
Clara L. Power
Inventor
Samuel R. Bailey

UNITED STATES PATENT OFFICE.

SAMUEL R. BAILEY, OF AMESBURY, MASSACHUSETTS.

CARRIAGE.

SPECIFICATION forming part of Letters Patent No. 460,547, dated October 6, 1891.

Application filed February 24, 1891. Serial No. 382,369. (No model.)

*To all whom it may concern:*

Be it known that I, SAMUEL R. BAILEY, of Amesbury, in the county of Essex and State of Massachusetts, have invented a new and useful Improvement in Carriages, which will, in connection with the accompanying drawings, be hereinafter fully described, and specifically defined in the appended claim.

In said drawings, Figure 1 is a rear elevation showing the right-hand portion of the hind axle, the side bar, and my improved means of connecting the two together. Fig. 2 is a sectional elevation, the view being from the left in Fig. 1, the axle being shown in cross-section and the side bar in longitudinal vertical section in part. Fig. 3 is a detached sectional elevation, the section being taken on line Z, Fig. 2, through the bar and the socket-plate, and the ball and part of its arm being shown in elevation. Figs. 4 and 5 show modifications of the means for securing the ball in the socket. Figs. 6, 7, and 8 are detached plan views to be described. Fig. 9 is an inverted plan view of a modification to be described. Fig. 10 is a partial side elevation of Fig. 9.

This invention relates to that class of vehicles known as "side-bar" carriages; and it consists in novel means for connecting the side bars with the hind axle, as will, in connection with the accompanying drawings, be hereinafter described and then claimed.

Referring again to said drawings, *a* represents the right-hand portion of the hind axle, to which is secured the upcurved arm *b*, terminating at top in a hemisphere or ball *c*, which fits into socket *e* in plate *d*, which latter is fitted to the under side of the spring-bar A, and is held thereto by clip *h*, that passes through perforated ears *f*, formed on the plate. To secure the ball in the socket, thin plates *g*, downcurved at their inner ends to fit beneath the ball, are secured beneath ears *f* by the clip-nuts *i*.

Instead of forming plates *g* as above described, and as shown in Fig. 6, they may be formed with a narrow end *j*, Fig. 7, which fits into a corresponding recess cut beneath the ball, as shown in Fig. 5, or, instead, a hole may be made through arm *b* at the base of the ball and a pin *k* inserted in the same, the ends of the pin being seated in recesses in plate *d*, so that nuts *i* secure the pin therein, these several methods of locking the socket-plates *b* and ball together being for the purpose of preventing the upward action of the springs from disengaging the two when the vehicle is in use.

The utility of this invention resides in the fact that in all cases the body is supported upon the side bars at a point or points between the front and rear axles, and hence the bars are bent downward by the load in proportion to the weight of the latter, and that it is requisite that the bar have a free pivotal action at its support at the hind axle, which pivot the ball and socket fully supplies. The front end of the bar being secured to the thin arm of a cross-spring, the latter yields torsionally to the requisite extent as the bar is deflected downward; and when the body is supported by the usual cross-springs *m*, secured to pivot-bolts *n* of shackles *l*, as in Fig. 2, the down pressure upon these cross-springs reduces their arch, and hence lengthens their base, which tends to force bars A asunder by springing them sidewise, thereby straining all the connections; but with the ball-and-socket connection the bars turn as upon a pivot when the strain of the cross-springs tends to force shackles *l* apart, thus allowing a free yielding of the bars both to down pressure or side pressure.

Having thus described my invention, what I claim as new, and desire to secure by Letters Patent, is—

As an improved connection between axle *a* and side bar A, the upcurved arm *b*, secured to the axle and terminating at its top in ball *c*, the plate *d*, formed to be clipped to bar A and having in its under side a cavity to receive said ball and fitting to the upper hemisphere thereof, and detents, substantially as described, to secure said plate and ball together, substantially as specified.

SAMUEL R. BAILEY.

Witnesses:
GEORGE H. BRIGGS,
DELL W. DOLBIER.